US006587767B2

(12) United States Patent
Letang et al.

(10) Patent No.: US 6,587,767 B2
(45) Date of Patent: Jul. 1, 2003

(54) MAINTENANCE ALERT SYSTEM FOR HEAVY-DUTY TRUCKS

(75) Inventors: Dennis Michael Letang, Canton, MI (US); Richard Michael Avery, Jr., West Bloomfield, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/960,866

(22) Filed: Sep. 21, 2001

(65) Prior Publication Data

US 2003/0060949 A1 Mar. 27, 2003

(51) Int. Cl.$^7$ .............................. G11B 5/02; G08E 23/00
(52) U.S. Cl. ........................... 701/29; 701/30; 702/182; 340/438
(58) Field of Search ................................ 701/29, 30, 31, 701/35, 36; 702/182, 183, 184; 73/116; 340/438, 439, 450

(56) References Cited

U.S. PATENT DOCUMENTS 4,621,335 A * 11/1986 Bluish et al. ............... 340/945
6,172,602 B1 1/2001 Hasfjord \* cited by examiner

*Primary Examiner*—Thomas G. Black
*Assistant Examiner*—Arthur D. Donnelly
(74) *Attorney, Agent, or Firm*—Brooks & Kushman P.C.

(57) ABSTRACT

A real-time maintenance alert system for use in a heavy duty truck having an engine including an engine controller having a communications data link is provided. The system includes an engine item sensor and a non-engine item sensor. Control logic at the engine controller produces an output signal at the data link in response to the presence of an engine item real-time fault condition. A display device transmits and receives information over the data link, and processes the control logic output signal. The display device generates an output signal indicative of the engine item status. Further, the display device directly receives and processes the non-engine item sensor output signal, and generates an output signal indicative of the non-engine item status.

7 Claims, 4 Drawing Sheets

MAINTENANCE ALERT SYSTEM FOR HEAVY-DUTY TRUCKS

TECHNICAL FIELD

The present invention relates to a real-time maintenance alert system for use in a heavy-duty truck having an engine controller with memory and a transmission.

BACKGROUND ART

In the control of fuel injection systems, electronic control units having volatile and non-volatile memory, input and output driver circuitry, and a processor capable of executing a stored instruction set are utilized to control various functions of the engine and its associated systems. A particular electronic control unit communicates with numerous sensors, actuators, and other electronic control units necessary to control various functions, which may include various aspects of fuel delivery, transmission control, or many others.

In heavy-duty truck applications, in addition to utilizing a highly complex engine controller that monitors the engine conditions so that when required, engine protection and engine shutdown logic may be executed to prevent possible engine damage, some normal service items of a truck must be physically inspected by opening the hood to physically check each item, preferably each time the truck is stopped. With the heavy-duty trucking industry becoming more and more competitive, maintenance reduction is becoming significantly more important. As such, it is sometimes undesirably time consuming to tilt the hood and physically check each normal service item of each truck throughout the day at a trucking bay.

For the foregoing reasons, there is a need for a system that facilitates the checking of normal service items of a truck.

SUMMARY OF THE INVENTION

It is therefore an object of the present invention to provide a real-time maintenance alert system for use in a heavy duty truck that allows normal service items of a truck to be checked at a glance, rather than opening the hood to physically check each item, and includes a display device configured to transmit and receive information over the data link, and directly receiving and processing non-engine item information.

In carrying out the above object and other objects and features of the present invention, a real-time maintenance alert system for use in a heavy duty truck having an engine including an engine controller having a communications data link is provided. The system comprises an engine item sensor, a non-engine item sensor, control logic at the engine controller, and a display device. The engine item sensor operates to produce a signal representing information indicative of an engine item condition. The non-engine item sensor operates to produce a signal representing information indicative of a non-engine item condition. The control logic is configured to process the engine item condition information and to determine a presence of an engine item real-time fault condition. The control logic is operative to produce an output signal at the data link in response to the presence of the engine item real-time fault condition. The display device has memory and is configured to transmit and receive information over the data link. The display device processes the control logic output signal and stores a status of the engine item in the memory. The display device generates an output signal indicative of the engine item status.

Further, the display device directly receives and processes the non-engine item sensor output signal and stores a status of the non-engine item in memory. The display device generates an output signal indicative of the non-engine item status. That is, advantageously, the display device transmits and receives information over the data link including engine item information based on sensor readings made by the engine controller. And further, the display device directly receives and processes non-engine item information to expand the real-time maintenance alert system capabilities to support items not directly monitored by the engine controller.

It is appreciated that engine item sensors may have various different types of outputs and the engine controller may have various corresponding types of inputs. For example, the engine item sensor may produce the signal at an analog or digital output with the engine controller having a corresponding analog or digital input to receive the engine item sensor output. Further, for example, the engine item sensor may produce the signal at a communications data link output and the engine controller then receives the engine item sensor output over the data link. Further, it is appreciated that the non-engine item sensor output signal that is directly received and processed by the display device may be received in a plurality of different ways. For example, the non-engine item sensor may produce the signal at an analog or digital output with the display device having a corresponding analog or digital input. Further, for example, the non-engine item sensor may produce the signal at a communications data link output with the display device receiving the non-engine item sensor output over the data link.

The advantages associated with embodiments of the present invention are numerous. For example, embodiments of the present invention allow normal service items of a truck to be checked at a glance rather than requiring opening of the hood to physically check each item. The display device is an intelligent device having memory and is configured to communicate over the data link, and store the fault condition status in the memory. Because the invention utilizes a communication data link of the engine controller, embodiments of the present invention have many advantages over the prior art. For example, in addition to displaying maintenance alert information, the display device may be configured to display periodic maintenance information or engine protection information when such information is available from the engine controller over the data link. As such, the intelligent display device having memory utilized in the invention is more versatile than existing systems.

The real-time maintenance alert system of the present invention, in addition to supporting items based on sensor readings made by the engine controller, has expanded capabilities. Specifically, the display device directly receives and processes non-engine item sensor output signals to support items not directly monitored by the engine controller. This allows other important maintenance items, that are not directly related to engine performance, to be monitored by the maintenance alert system. These items include, but not are limited to, transmission filter restriction, windshield washer fluid level, power steering fluid level, low fuel level, oil quality, and low tire pressure. A preferred embodiment of the maintenance alert system could support all fluids, filters, and any other maintenance item that can be electronically monitored by allowing non-engine sensors to send information directly to the maintenance alert system display device in addition to the display device receiving information from the engine controller.

The above object and other objects, features, and advantages of the present invention are readily apparent from the following detailed description of the preferred embodiment when taken in connection with the accompanying drawings.

DETAILED DESCRIPTION OF THE PREFERRED EMBODIMENT

Figure 1:
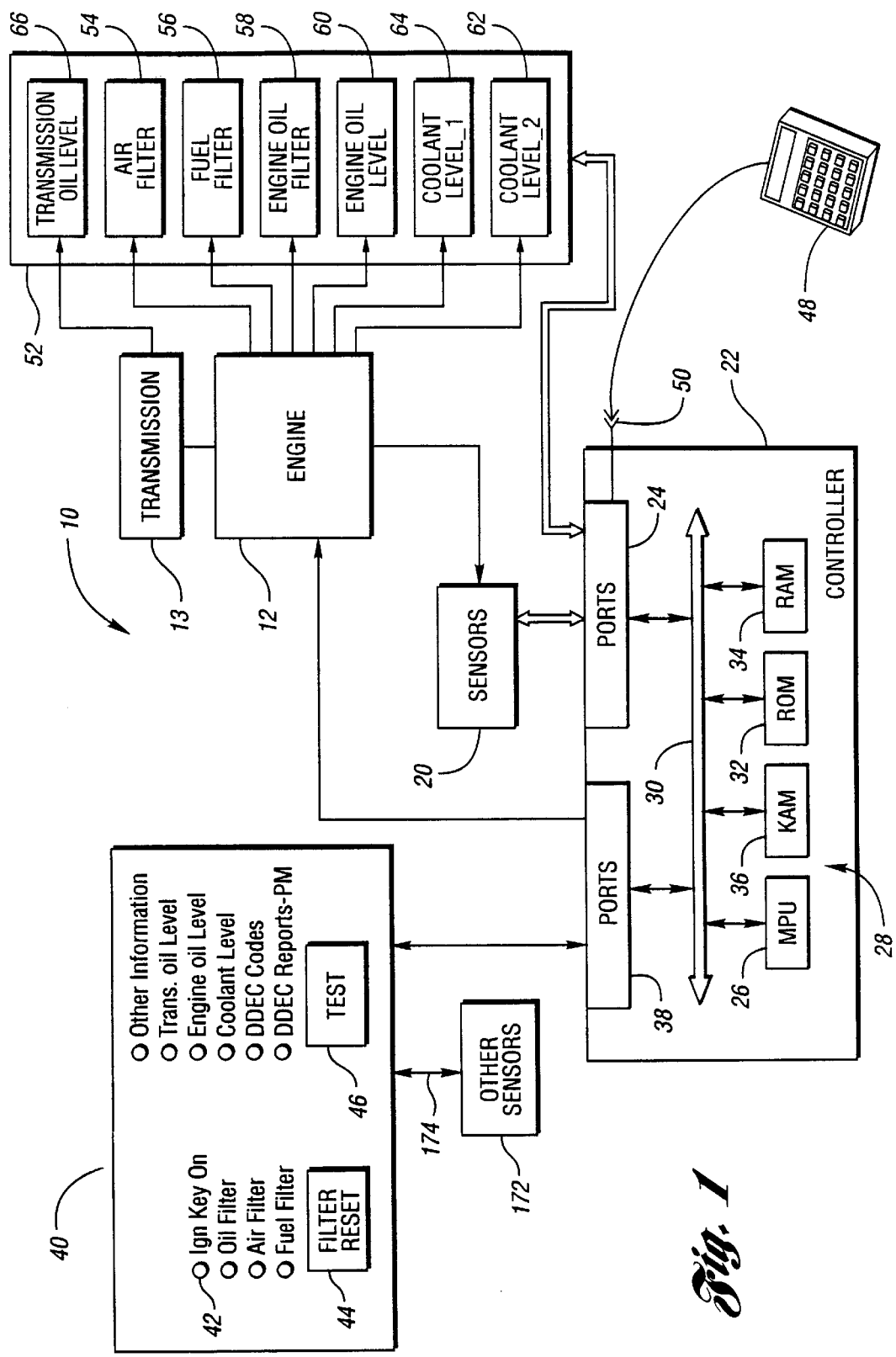
FIG. 1 is a schematic diagram of a fuel injection system made in accordance with the present invention.

Referring to FIG. 1, a system for controlling a heavy duty truck is shown. The system, generally indicated by reference numeral 10, includes an engine 12 having a plurality of cylinders, fed by fuel injectors. In a preferred embodiment, engine 12 is a compression-ignition internal combustion engine, such as a four, six, eight, twelve, sixteen or twenty-four cylinder diesel engine, or a diesel engine having any other desired number of cylinders. The fuel injectors are receiving pressurized fuel from a supply connected to one or more high or low pressure pumps (not shown) as is well known in the art. Alternatively, embodiments of the present invention may employ a plurality of unit pumps (not shown), with each pump supplying fuel to one of the injectors.

The system 10 may also include various sensors 20 for generating signals indicative of corresponding operational conditions or parameters of engine 12, the vehicle transmission 13, and other vehicular components. Sensors 20 are in electrical communication with a controller 22 via ports 24. Controller 22 preferably includes a microprocessor 26 in communication with various computer readable storage media 28 via data and control bus 30. Computer readable storage media 28 may include any of a number of known devices which function as a read-only memory (ROM) 32, random access memory (RAM) 34, keep-alive memory (KAM) 36, and the like. The computer readable storage media may be implemented by any of a number of known physical devices capable of storing data representing instructions executable via a computer such as controller 22. Known devices may include, but are not limited to, PROM, EPROM, EEPROM, flash memory, and the like in addition to magnetic, optical, and combination media capable of temporary or permanent data storage.

Computer readable storage media 28 include various program instructions, software, and control logic to effect control of various systems and subsystems of the vehicle, such as engine 12, the vehicle transmission 13, and the like. Controller 22 receives signals from sensors 20 via ports 24 and generates output signals which may be provided to various actuators and/or components via ports 38. Signals may also be provided to a display device 40 which includes memory as well as various indicators such as lights 42 to communicate information relative to maintenance alert system operation. Further, display device 40 may be provided with a reset switch 44 and a test switch 46.

A data, diagnostics, and programming interface 48 may also be selectively connected to controller 22 via a plug 50 to exchange various information therebetween. Interface 48 may be used to change values within the computer readable storage media 28, such as configuration settings and control logic.

In accordance with the present invention, in addition to sensors 20 which are tied to engine control features, engine protection features, and shutdown logic, engine 12 communicates with a plurality of additional sensors 52. In particular, indicators 42 on display device 40, in accordance with the present invention, display information obtained from additional sensors 52 whose outputs are processed at engine controller 22. In accordance with the present invention, additional sensors 52 include at least one of the following sensors: air filter restriction sensor 54, fuel filter restriction sensor 56, oil filter restriction sensor 58, oil level sensor 60, coolant level_2 sensor 62 and transmission oil level sensor 66. Coolant level_1 sensor 64 is tied to engine protection control logic and sensors 20, but is shown near coolant level_2 sensor 62 to show the interrelation of the two sensors as will be described along with further description of the sensors in sensor group 52 in accordance with the present invention. Of course, it is to be appreciated that in accordance with the present invention, maintenance alert system control logic which utilizes outputs from sensor group 52 operates independently of normal control logic for engine control, engine protection and engine shutdown control. Alternatively, the transmission oil level sensor may be utilized together with shutdown and/or torque/speed limiting logic to protect the transmission.

In operation of normal engine logic (not including control logic associated with sensors 54, 56, 58, 60, 62, and 66), controller 22 receives signals from sensors 20 and 64 and executes control logic embedded in hardware and/or software to control engine 12. In a preferred embodiment, controller 22 is the DDEC controller available from Detroit Diesel Corporation, Detroit, Mich.

As will be appreciated by one of ordinary skill in the art, the control logic may be implemented or effected in hardware, software, or a combination of hardware and software. The various functions are preferably effected by a programmed microprocessor, such as the DDEC controller, but may include one or more functions implemented by dedicated electric, electronic, or integrated circuits. As will also be appreciated, the control logic may be implemented using any one of a number of known programming and processing techniques or strategies and is not limited to the order or sequence illustrated here for convenience. For example, interrupt or event driven processing is typically employed in real-time control applications, such as control of a vehicle engine or transmission. Likewise, parallel processing or multi-tasking systems and methods may be used to accomplish the objects, features, and advantages of the present invention. The present invention is independent of the particular programming language, operating system, or processor used to implement the control logic illustrated.

In accordance with the present invention, as shown in FIG. 1, the maintenance alert system is designed to reduce maintenance time for heavy duty trucks by allowing several items of a truck to be checked at one time without opening the hood. As shown in FIG. 1, the maintenance alert system supports transmission oil level, air filter restriction, fuel filter restriction, engine oil filter restriction, engine oil level, and coolant level. To expand the capabilities of the system, other sensors 172 may communicate directly with display device 40 as indicated by path 174. That is, the maintenance alert system supports items based on sensor readings made by engine controller 22 (sensors 54, 56, 58, 60, 62, 64, and 66). Maintenance alert system capabilities are expanded by supporting non-engine items not directly monitored by controller 22. Sensors 52 may provide information to engine controller 22 in any of a variety of different ways. For example, a sensor may provide a signal to an analog sensor input on controller 22, or alternatively, may provide a digital input to controller 22. Further, in the alternative, the present invention comprehends an enhanced sensor configured to communicate over the engine controller data link, with a twisted pair connecting the sensor to the controller. Further, in the alternative, a sensor may be connected to a different controller, with that controller providing the communication to the main engine controller over the data link. For example, in an engine having a separate transmission controller, the transmission oil level sensor may provide information to the transmission controller, with the transmission controller providing information to the main engine controller. It is appreciated that the engine controller data link may be configured in accordance with any known communication protocols for use with engine control modules such as, for example, SAE J1587, SAE J1922, SAE J1939, controller area network (CAN) protocol, etc.

In addition, in accordance with the present invention, other sensors 172 communicate 174 with display device 40. Display device 40 directly receives and processes non-engine item sensor output signals from other sensors 172 and stores a status of these items in memory. Display device 40 generates output signals indicative of any sensor readings made by the engine control unit or other sensors 172. In addition, communication 174 between other sensors 172 and display device 40 may take any suitable format such as those described above for communications between sensors 52 and engine controller 22.

Other sensors 172 allow for other important maintenance items that are not directly related to engine performance to be monitored by the maintenance alert system. These items include, but are not limited to, transmission filter restriction, windshield washer fluid level, power steering fluid level, low fuel level, oil quality, and low tire pressure. The improvement provided by the present invention allows the maintenance alert system to support all fluids, filters, and any other maintenance items that can be electronically monitored regardless of whether or not such items are regularly monitored by the engine control unit.

Figure 2:
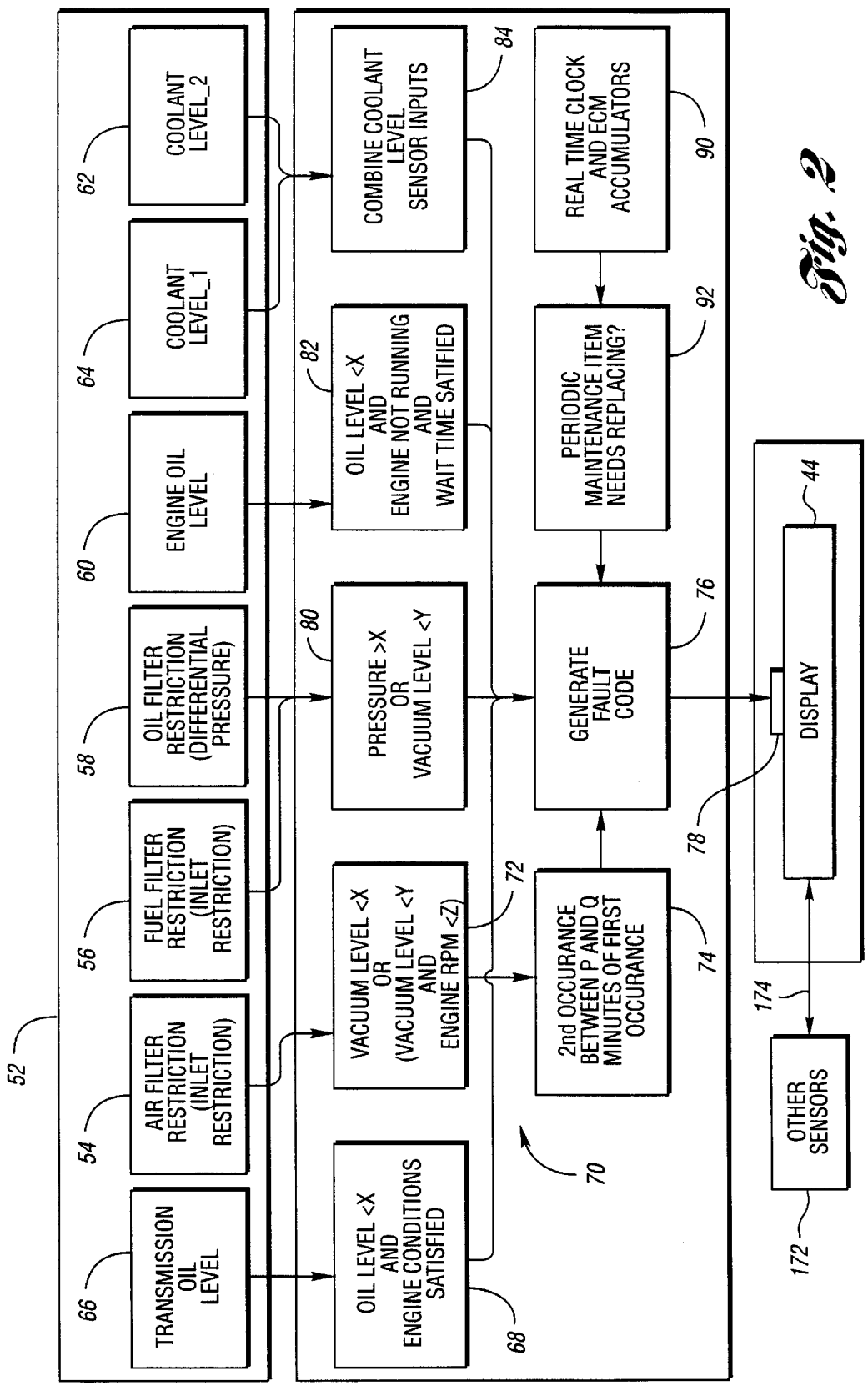
FIG. 2 is a functional block diagram illustrating a real-time maintenance alert system for a heavy-duty truck and associated methods used by the system.

With reference to FIG. 2, the operation of a maintenance alert system in accordance with the present invention is illustrated, along with control logic 70 within engine controller 22 that processes outputs from sensor group 52 to provide input signals for display device 40. Air filter restriction sensor 54, preferably, is mounted on the air intake tube after the air cleaner or on the air cleaner and monitors air inlet depression. Sensor 54 is designed to trigger at one of two set points based on air inlet depression and generate a fault code. The fault code indicates that the air filter is plugged and needs to be replaced. That is, a very large pressure drop across the air filter as determined by measuring air inlet depression, may be used as a reliable indicator of a clogged air filter that needs replacement. Additional control logic is preferably built into the engine controller to help prevent false air filter restriction codes due to wet filters or clogged air intakes due to snow and ice build-up.

Control logic at engine controller 22 is configured as follows. The control logic processes the signal from air filter restriction sensor 54 to determine an air filter restriction real-time fault condition when the air inlet depression falls below a threshold, as indicated at block 72 with the expression: vacuum level is less than X. In a preferred embodiment, as shown at block 72, the threshold is a function of engine rpm and particularly, the threshold is a first value (Y) when the engine rpm is less than a predetermined value (Z) and otherwise the threshold is the second value, X.

Further, in a preferred embodiment, the air filter restriction real-time fault condition is determined in response to the air inlet depression falling below the threshold more than one time during a predetermined time interval. As indicated at control logic block 74, it is preferred that a real-time fault condition only be logged when a second occurrence of a sensor output indicating an air filter restriction occurs between P and Q engine hours after a first occurrence thereof. Still further, it is preferred that at control logic block 72, the sensor output is filtered such that vacuum level or inlet depression must fall below the threshold for a significant amount of time (preferably predetermined), before one of the "less than" conditions can be satisfied. That is, for vacuum level to be considered less than the threshold by control logic block 74, vacuum level must fall below the threshold for a predetermined significant amount of time. This implementation is preferred to prevent accidental and unnecessary fault logging.

Fuel filter restriction sensor 56 is positioned and configured to monitor fuel inlet restriction and is preferably configured to measure depression after the filter. Oil filter restriction sensor 58 is configured and positioned to measure differential pressure across the oil filter. Oil filter restriction sensor 58, preferably, is mounted in a special adaptor that is located between the engine oil filter housing and the front oil filter. The sensor measures the pressure differential between the oil filter inlet and outlet. Once this pressure exceeds a preset value or predetermined threshold, the oil filter is deemed to be too restrictive and the appropriate fault code is generated. There is special logic built into the system to compensate for cold oil and to provide back up warning in the event that the sensor fails. As shown at control logic block 80, a real-time fault may be determined by the maintenance alert system in the event that the differential pressure exceeds a threshold, X, or in the event that the vacuum level (due to a fuel filter inlet restriction) falls below a threshold, Y. Further, similar to air filter restriction sensor 54, sensors 56 and 58 preferably have outputs that are filtered by the control logic such that a predetermined significant amount of time must pass with differential pressure greater than X or vacuum level less than Y prior to a fault being logged in the system.

Oil level sensor 60, preferably, is mounted in the engine oil pan and will indicate low oil around the "add" mark on the dip stick, which is sometimes in a heavy-duty engine, the four quart low mark. In such an embodiment, the oil level can only be checked with the engine off (zero engine rpm). Further, in such an embodiment, there is also a wait time associated with the oil level sensor because it will take several minutes for the oil to drain back to the sump after the engine is stopped. After this wait time, if the oil level sensor determines that the oil level is low, a fault code is generated. As shown by control logic block 82, in a preferred embodiment, a fault condition is determined when the oil level falls below a threshold, X, and the engine is not running, and the engine has not been running for a predetermined amount of time or wait time.

Coolant level_2, or maintenance fault coolant level sensor 62, preferably, is mounted in the surge tank and is designed to indicate low coolant around the three quart low point, or three quarts below the top of the tank. This will give notice to the operator/mechanic that the coolant level is lower than normal before the primary coolant level sensor (coolant level_1 or shutdown coolant level sensor 64) triggers an engine shutdown (if programmed for shutdown). Preferably, the fault coolant level sensor 62 is configured such that when the sensor is "dry," the appropriate fault code is generated. Further, a special module may be required to process the electronic signal from the sensor prior to processing by controller 22.

As shown, engine controller 22, as mentioned previously, operates shutdown logic that may be triggered based on the output of shutdown coolant level sensor 64, in addition to fault coolant level sensor 62 of the present invention providing a signal to engine controller 22 for maintenance system operation. The outputs of the two sensors are shown together entering control block 84, but it is to be understood and is appreciated by one of ordinary skill in the art that in accordance with the present invention, the outputs of sensors 54, 56, 58, 60, and 62 (FIG. 1) are processed by control logic within controller 22 that is separate from any engine protection or engine shutdown control logic, and is provided specifically to allow an operator/mechanic to readily see the condition of various engine items without being required to open the truck hood. Transmission oil level sensor 66, preferably, is also included in the maintenance alert system.

Most preferably, the transmission oil level sensor will take a reading when the engine is not running (a short period of time after shutdown for hot oil and a longer period of time for cold oil). Another implementation could provide a transmission oil level sensor capable of checking the oil level during operation. In one implementation, the transmission oil level sensor detects a single level (low or not low). Alternatively, an implementation could offer a transmission oil level sensor capable of detecting multiple levels. Further, it is appreciated that the transmission oil level sensor of the present invention may be utilized for manual, semi-automatic, or automatic transmissions.

Further, it is appreciated that preferred embodiments of the present invention utilize the display device with memory for notifying the driver or maintenance person of the condition of the transmission oil, but a number of different additional methods may also be utilized for notification to provide fault tolerance, and the notification could occur at any suitable time. For example, the notification may occur upon engine start up, during engine operation, or after shutdown. Further, the notification preferably appears on a display device such as the maintenance alert display device, but may also appear through the check engine light, the stop engine light, a check transmission light, an oil level low light, or any other available output visible to the driver or maintenance person. Still further, notification of the transmission oil level may be provided through any of the various service tools to check stored troubleshooting information logged by controller 22 when a transmission oil level fault occurs including time and date and engine hours of first occurrence and last occurrence, occurrence count and duration, etc. Even further, the notification of the transmission oil level status could be automatic or on request.

With continuing reference to FIG. 2, after outputs 52 are processed by various logic blocks 72, 74, 80, 82, 84 within engine controller 22, fault codes are generated by control logic block 76 when necessary and are sent to display device 44 by a connection interface 78. As described above, in addition to the control logic of the present invention that implements a maintenance alert system, additional maintenance control logic that is not real-time based is preferably also implemented. Of course, it is to be appreciated that the real-time based maintenance alert system of the present invention is advantageous in that normal maintenance items are monitored in real-time to allow a mechanic/operator to check engine item integrity without being required to tilt the hood. An example of a non-real-time maintenance control logic that may optionally be implemented is indicated at a control logic block 90 and control logic block 92. Control logic block 90 is a real-time clock and a set of engine control module accumulators. Control block 92 determines that maintenance is required when a predetermined amount of time or amount of distance on the odometer has passed since a last maintenance event. For example, an "oil change needed" alert may be produced after a set amount of mileage has passed on the odometer after a previous oil change performed at a time that the timer was reset. That is, control logic 90 and 92 provide periodic maintenance monitoring as opposed to real-time monitoring.

It is to be appreciated that in accordance with the present invention, display monitor 44 is optional, and receives information by reading the data link interface 78. In addition, maintenance alert systems of the present invention are preferably implemented so as to be supported by controller diagnostics (interface 50, FIG. 1) so that the maintenance alert system may optionally drive the check engine light and stop engine light instead of the monitor. Still further, if desired, device 48 (FIG. 1) may be configured to display information as an alternative or in addition to display monitor 44. Still further, device 44 may be configured with an additional indicator for alerting an operator of engine protection faults normally associated with any existing controller diagnostics.

In addition, FIG. 2 illustrates other sensors 172 communicating with display device 44 over link 174. As mentioned above, this allows other important maintenance items that are not directly related to engine performance to be monitored by the maintenance alert system. Specifically, in addition to the engine item sensors and control logic at the engine controller, other, non-engine item, sensors 172 produce signals representing information indicative of various conditions. Display device 44 directly receives and processes the other sensor output signals and stores appropriate status information in memory. As such, in addition to the output signals indicative of the status of items monitored by the engine controller, display device 44 also generates outputs indicative of the status of items monitored by other sensors 172.

Figure 3:
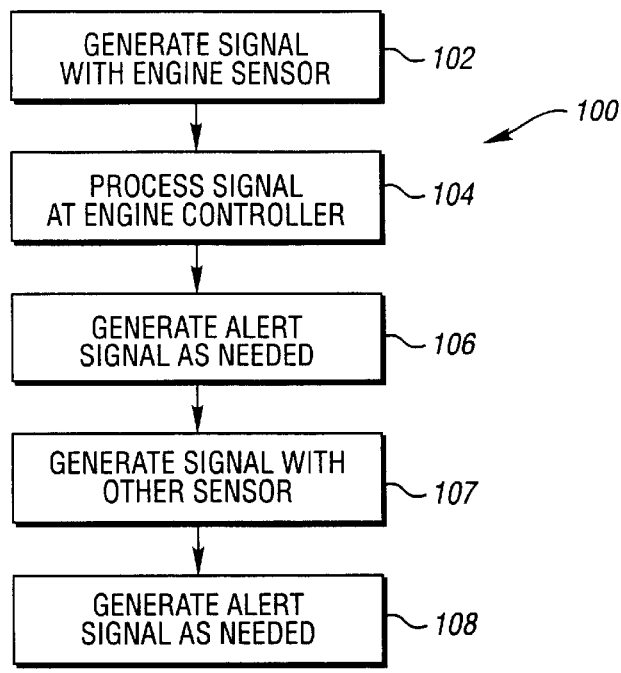
FIG. 3 is a block diagram illustrating a real-time maintenance alert method of the present invention.

With reference FIG. 3, a real-time maintenance alert method for use in a heavy-duty truck having an engine including an engine controller with memory is generally indicated at 100. In accordance with the method, a signal is generated with an engine sensor at block 102. The signal indicates at least one engine condition from the group consisting of an oil filter restriction condition, a fuel filter restriction condition, an air filter restriction condition, an engine oil level, a transmission oil level, and a coolant level in a coolant reserve tank. As described above, the oil filter restriction condition is preferably determined by measuring differential pressure, while the fuel and air filter restriction conditions are preferably determined by measuring inlet depression. Still further, the oil level is preferably determined with a sensor that provides valid output when the engine has stopped, and when the engine has not been running for a predetermined amount of time. Further, the fault coolant level sensor utilizes maintenance control logic that is separate from any existing engine protection or shutdown control logic, but preferably is implemented so as to co-exist with a primary (shutdown) coolant level sensor such that the fault coolant level sensor of the present invention provides an early warning of potentially dangerously low coolant conditions in the near future. At block 104, the signal or signals from the sensor output or outputs are processed at the engine controller. Control logic at the engine controller processes the sensor signal to determine a real-time fault condition when the engine condition falls outside of the predetermined acceptable range. For example, the acceptable range may be determined by a single threshold value, or a plurality of threshold values with the appropriate threshold value being determined based on other engine conditions, such as engine rpm (for example, control block 72, FIG. 2). At block 106, an alert signal is generated as needed on the display monitor, or optionally with the check engine and stop engine lights or other lights depending on the implementation of the present invention.

Further, at block 107, signals are generated with other sensors. At block 108, alert signals are generated as needed based on the information obtained from the other, non-engine, sensors. Optionally, the check engine and stop engine lights or other lights depending on the implementation of the present invention may be driven to generate alert signals.

Is to be appreciated that embodiments of the present invention are particularly useful because maintenance reduction is becoming significantly more important in the trucking industry. Maintenance alert systems of the present invention provide an easy to use information center connected to the engine that can be used to display the current "go/no go" status of the normal service items of a truck at a glance rather than requiring the operator/mechanic to open the hood and physically check each item. Preferably, the maintenance alert system is mounted in an interior location easily accessible from outside the truck for mechanics and other service personnel to view.

Figure 4:
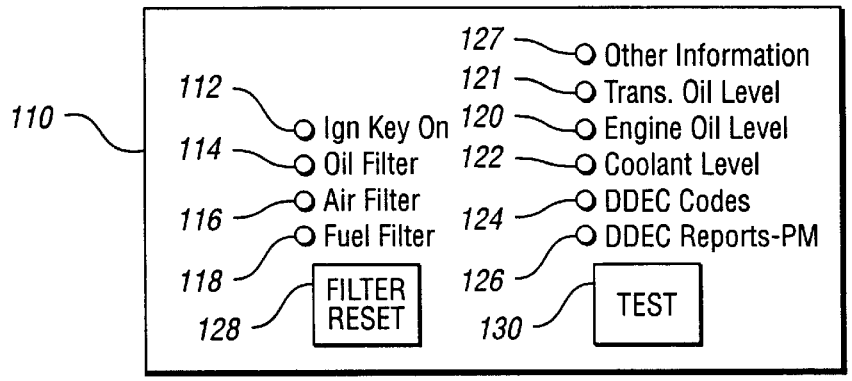
FIG. 4 is a display device of the present invention for use in a real-time maintenance alert system.

With reference to FIG. 4, a preferred embodiment for the display device is illustrated. Of course, it is to be appreciated that display 110 may take a variety of different forms, and the following description is of a preferred implementation thereof. As shown, display device 110 ten indicators that are preferably tricolor light emitting diodes (LEDs) and two switches (filter reset and test). As shown, indicator 112 is illuminated when the ECM is asleep (recommending the key be turned on), indicator 114 indicates the condition of the oil filter, indicator 116 indicates the condition of the air filter, indicator 118 indicates the condition of the fuel filter, indicator 120 indicates the condition of the engine oil level, indicator 122 indicates the condition of the coolant level, indicator 124 indicates the presence of any engine controller engine protection fault codes that may be read at the diagnostics interface, indicator 126 indicates the presence of any periodic (mileage or time based) maintenance events. Indicator 127 indicates information from non-engine sensors. Although only a single non-engine sensor indicator is shown, additional indicators may be provided. Further, a reset switch 128 is provided to reset display memory of filters and reread each sensor, and a test switch 130 is provided to test the functioning of the lights and display current data. In a preferred construction, display device 110 is approximately three inches high, five inches wide, and two inches deep. Further, indicator 121 indicates the condition of the transmission oil level.

Figure 5:
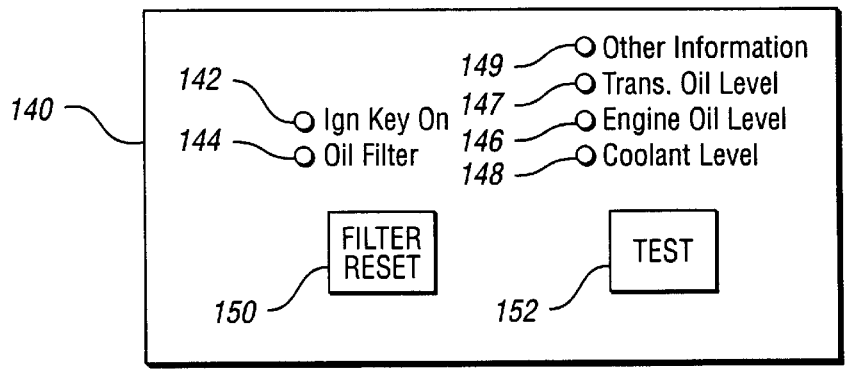
FIG. 5 is an alternative display device of the present invention for use with a real-time maintenance alert system.

With reference to FIG. 5, an alternative display 140 is shown. In the alternative, several of the indicators may be omitted, while providing a selected one or more of the indicators and the appropriate corresponding sensors. In the alternative embodiment, an ignition key "on" indicator 142, an oil filter condition indicator 144, an engine oil level condition indicator 146, a transmission oil level condition indicator 147, a coolant level condition indicator 148 and other information indicator 149 are provided. Further, preferably, a reset switch 150 and a test switch 152 are provided.

Figure 6:
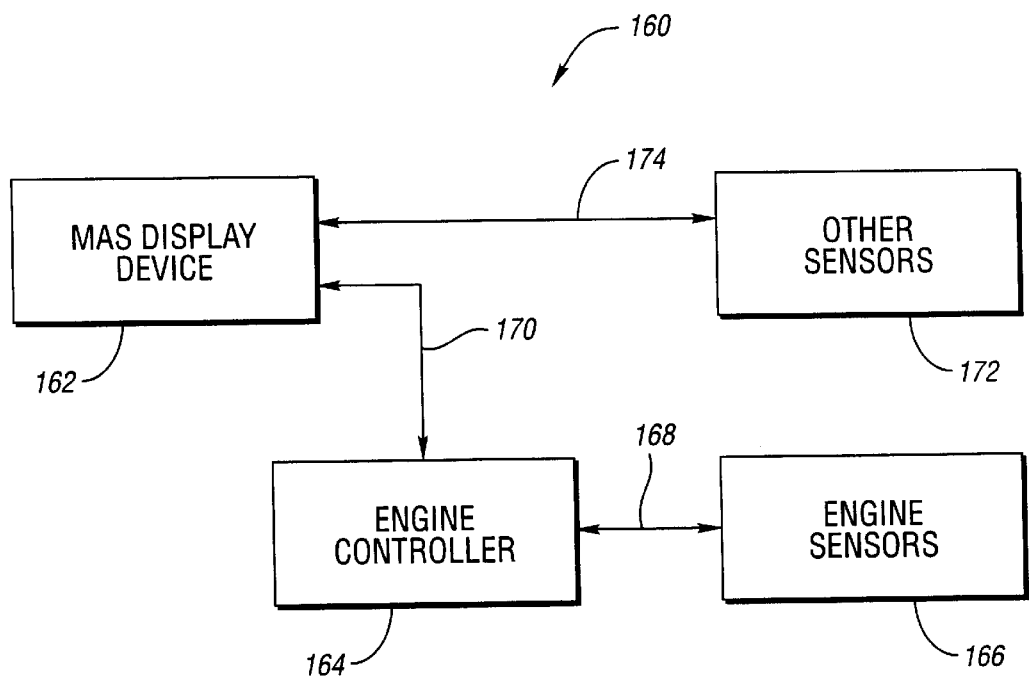
FIG. 6 is a block diagram of a system of the present invention.

FIG. 6 generally illustrates the expanded capabilities of the maintenance alert system in accordance with the present invention. The system is generally indicated at 160, and includes display device 162. Engine controller 164 receives information from engine sensors 166 in any suitable fashion through path 168. Engine controller 164 communicates with display device 162 through data link 170. Other sensors 172 also communicate with display device 162 as indicated by communication link 174. Control logic at engine controller 164 processes engine item condition information from engine sensors 166 to determine a presence of an engine item real-time fault condition. Output signals are passed over data link 170 to display device 162 in the presence of an engine item real-time fault condition. Display device 162 has memory and is configured to transmit and receive information over data link 170. Display device 162 processes the control logic output signals and stores a status of the engine items in memory. Display device 162 directly receives and processes non-engine item sensor output signals from other sensors 172 and stores a status of the non-engine items in memory. Display device 162 generates output signals indicative of the engine item status received from engine controller 164 and the non-engine item status received from other sensors 172.

Although the present invention has been described in sufficient detail above, the description found hereinafter is provided to explain in great detail, a suitable implementation of the maintenance alert system using the preferred DDEC controller, of course, it is to be appreciated that the suitable implementation description that follows is exemplary only and is not intended to limit the broad scope and spirit of the invention.

In a preferred embodiment, the display device has both read and transmit capabilities to access diagnostic codes about the normal service items from the truck's data link preferably adhering to SAE J1708 for hardware and SAE J1587 for the communications protocol. In addition to the normal service items, preferred embodiments of the display device also look for extra service indicators (ECM fault codes and periodic maintenance reports). The codes read from the data link are processed and stored within the display device to be displayed on an indicator panel display. The display preferably has each monitored item name printed on the display panel with a bicolored indicator next to the name. The indicator, preferably an LED, is red if the monitored item needs service, and is green if the item is acceptable and does not need servicing, and is off if the particular sensor is not configured.

Preferably, the display can request a unique message a short time after key on which will determine which of the lights and associated hardware on the display will be used. Thereafter, the display listens passively for a specific fault code associated with the maintenance monitor sensors via the data bus. As the specific fault codes are received, the stored go/no go status for each parameter is updated for later display. When the ignition is not on, but the engine controller is still awake, the engine controller will not be continuously broadcasting data, but will accept and respond to requests. Just before the engine controller is powered down, it will again broadcast the fluid levels, faults, and PM data.

After the engine controller has powered down, it will not respond to requests.

The display unit test button, preferably a momentary contact switch, initiates a test sequence. Once the test sequence is initiated, the display will perform a bulb check by turning on all of the indicators to green for approximately one second, then to red for approximately one second. The display will then request the current periodic maintenance data, then the current information from memory will be used to turn the indicators to their appropriate color for the data. When a test sequence is initiated with the ignition on, the display has been passively listening and will have current data in memory for the sensors, but will still need updated periodic maintenance information. When the ignition is not on, but the engine controller is still active, a request must be sent to the engine controller for the fluid level as well as the periodic maintenance data to update the memory before displaying. When the ignition is not on and the engine controller is not active, the data stored in memory will be used for display.

The display unit also preferably has reset capabilities via a reset button (preferably a momentary contact switch) to be used after service has been performed to any of the filter items being monitored. The reset clears the display memory of retrieved codes for the configured filter items, thus changing the red indicators to green until new data is received and stored. Pressing and holding the reset button for three seconds or longer preferably initiates the reset sequence. The indicators will then light with the appropriate color, based on the new information as it is received.

In a preferred embodiment, the display device also performs minor diagnostics to inform the operator if the connection to the data link has been broken. This will be known if the ignition input is energized but no bus activity is seen within two seconds. When this condition occurs, the display device will flash all indicators red at roughly 2 Hz while the ignition is on until the reset button is pushed, at which time the display will go blank. If the display device is energized via the test button before the link connection has been repaired, the indicators will again flash red in place of the normal service items status until the ten seconds no activity timer has expired. After the display sees data bus activity, it will avert back to normal operation with the currently stored data and normal updates.

The messaging used preferably meets SAE J1587 communications protocol which is hereby incorporated by reference. Knowing this determines the following PART IDENTIFICATIONS (PID):

| Data | PID |
| --- | --- |
| Air Filter Restriction | 107 |
| Coolant level | 111 |
| Fuel Filter Restriction | 95 |
| Oil Filter Restriction | 99 |
| Engine Oil Level | 98 |
| Transmission Oil Level | 124 |
| Transmission Oil Level High/Low | 125 |
| Fault Codes | 194/192 |

Normal Operation

Once the maintenance alert system is in the normal operating mode (passive listening), the system monitors fault codes from both the engine ECM and the maintenance sensors. Each fault code received about the maintenance sensors will only effect the status of one LED. The LEDs for the levels and the filters will only turn red for service if the fluid is low or the filter restriction is high.

In one suitable indicator configuration using LEDs, the LED functioning is as follows:

LED 1, "Ign Key On"

The function of this light is to inform the operator when the display is showing memory data rather than current data. This LED will use the +5V sensor supply input wire. The LED will be:

RED—Sensor supply voltage input grounded (Memory Data).

OFF—Sensor supply voltage input at +5V (Current Data).

LED 2, "Engine Oil Level"

The engine oil level LED will be:

RED—Engine Oil Level PID 98 FMI 1 only (Engine Oil Level Low).

GREEN—Engine Oil Level PID 98 received without fault codes for PID 98.

YELLOW (drive both red and green)—Engine Oil Level PID 98 not received even though configured.

OFF—Engine Oil level not configured OR fault codes for PID 98 other than FMI 1.

LED 3, "Oil Filter"

The oil filter LED will be:

RED—Oil filter restriction PID 99 FMI 0 only (Primary Oil Filter Restriction High).

GREEN—Oil filter restriction PID 99 received without fault codes for PID 99.

OFF—Oil filter restriction not configured OR fault codes for PID 99 other than FMI 0.

LED 4, "Coolant Level"

The coolant level LED will be:

RED—Coolant level PID 111 FMI 1 only (Coolant level low).

GREEN—Coolant level PID 111 received without fault codes for PID 111.

OFF—Coolant level not configured OR fault codes for PID 111 other than FMI 1.

LED 5, "Air Filter"

The air filter restriction LED will be:

RED—Air filter restriction PID 107 FMI 0 only (Air Filter Restriction High).

GREEN—Air filter restriction PID 107 received without fault codes for PID 107.

OFF—Air filter restriction not configured OR fault codes for PID 107 other than FMI 0.

LED 6, "DDEC Codes" (Protection Faults)

The ECM codes LED is intended to assist service personnel by indicating the presence of fault codes in the ECM. The ECM Codes LED will be:

RED—The presence of any active fault code from MID 128.

YELLOW—The presence of only inactive fault codes from MID 128.

GREEN—No fault codes from MID 128.

LED 7, "Fuel Filter"

The fuel filter restriction LED will be:

RED—Fuel filter restriction PID 95 FMI 0 only (Primary Fuel Filter Restriction High).

GREEN—Fuel filter restriction PID 95 received without fault codes for PID 95.

OFF—Fuel filter restriction not configured OR fault codes for PID 95 other than FMI 0.

LED 8, "DDEC Reports—PM" (Periodic Maintenance)

The Data Pages portion of the ECM has three preventative maintenance reminders normally to be accessed through the DDEC Reports Software package. An ECM unique message will be used and can be requested to show the configuration/status of the PM reminders.

The DDEC Reports LED will be:

RED—Any one or more of the PM reminders is configured and needs service.

GREEN—None of the configured PM reminders need service.

OFF—None of the PM reminders are configured.

LED 9, "Transmission Oil Level"

The transmission oil level LED will be:

RED—Transmission Oil Level PID 124 (or 125) FMI 1 only (Transmission Oil Level Low).

GREEN—Transmission Oil Level PID 124 (or 125) received without fault codes for PID 124 (or 125).

YELLOW (drive both red and green)—Transmission Oil Level PID 124 (or 125) not received even though configured.

OFF—Transmission Oil level not configured OR fault codes for PID 124 or (125) other than FMI 1.

The remaining one or more other information LEDs represent information obtained from the non-engine sensors, and any suitable driving technique may be utilized.

Preferably, the display unit is mounted inside the truck cab on the floor beside the driver's seat for easy viewing and access while standing outside the truck with the driver's door open. The case of the display should then have easy mounting to the floor either directly or via a suitable bracket thus making for easy viewing conditions while standing just outside the door. This mounting location also necessitates that the case be made of a reasonably sturdy material to prevent damage if bumped with a hammer, fire extinguisher, etc. The display should be sealed for the occasional cleaning of the cab via water hose and a have a −40 to 85 degree Celsius temperature range. The products used preferably also are built to withstand the normal cleaning fluids and other materials found inside a truck just as the main instrument panel must.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A real-time maintenance alert system for use in a heavy duty truck having an engine including an engine controller having a communications data link, the system comprising:

an engine item sensor operative to produce a signal representing information indicative of an engine item condition;

a non-engine item sensor operative to produce a signal representing information indicative of a non-engine item condition;

control logic at the engine controller, the control logic being configured to process the engine item condition information and to determine a presence of an engine item real-time fault condition, the control logic being operative to produce an output signal at the data link in response to the presence of the engine item real-time fault condition; and a display device having memory and configured to transmit and receive information over the data link, the display device processing the control logic output signal and storing a status of the engine item in the memory, and generating an output signal indicative of the engine item status, the display device directly receiving and processing the non-engine item sensor output signal and storing a status of the non-engine item in memory, and generating an output signal indicative of the non-engine item status.

2. The system of claim 1 wherein the engine item sensor produces its signal at an analog output and the engine controller has an analog input receiving the engine item sensor output.

3. The system of claim 1 wherein the engine item sensor produces its signal at a digital output and the engine controller has a digital input receiving the engine item sensor output.

4. The system of claim 1 wherein the engine item sensor produces its signal at a communications data link output and the engine controller receives the engine item sensor output over the data link.

5. The system of claim 1 wherein the non-engine item sensor produces its signal at an analog output and the display device has an analog input receiving the non-engine item sensor output.

6. The system of claim 1 wherein the non-engine item sensor produces its signal at a digital output and the display device has a digital input receiving the non-engine item sensor output.

7. The system of claim 1 wherein the non-engine item sensor produces its signal at a communications data link output and the display device receives the non-engine item sensor output over the data link.

* * * * *